United States Patent Office 3,127,290
Patented Mar. 31, 1964

3,127,290
NON-CORROSIVE MODIFIED ROSIN FLUX
Otto Konig, Forest Hills, N.Y., assignor to National Lead Company, New York, N.Y., a corporation of New Jersey
No Drawing. Filed Jan. 11, 1961, Ser. No. 81,946
3 Claims. (Cl. 148—23)

This invention relates to a soldering flux, and more particularly to a non-corrosive rosin flux.

Heretofore, chemically active substances have been found that effectively act as fluxes for solder, such as acid or halide salts. Utilization of these fluxes is prohibitive in applications concerning electrical connections and joints inasmuch as the residues which remain are of a corrosive nature. To overcome this disadvantage, the art has turned to rosin which does not possess corrosive characteristics nor leave corrosive residues. However, rosin is not as effective as the more chemically active substance, since it has poor fluxing efficiency, namely poor cleaning of dirty or oxidized surfaces and poor promotion of solder flow. Activated rosin fluxes have been proposed, attempting to overcome these shortcomings, by introducing organic base halide salts, amine hydrochlorides and other ionic salt type compounds. While the fluxing activity of the rosin was improved, serious corrosive after effects were introduced due to hydrolysis of the residues in moist air. Usually, ionically activated rosin fluxes will not meet the rigid requirements, as set forth in Federal Specification QQ-S-571C, established for rosin fluxes intended for electrical applications. In addition, many of the organic base halides are toxic in themselves and decompose at soldering temperatures producing noxious and toxic fumes and gases.

Therefore, an object of this invention is to provide a non-corrosive rosin flux with improved flow characteristics. Another object is to provide a flux whose electrical resistivity is high. A further object is to provide a flux having the additional characteristic of being free of unpleasant or toxic fumes. Other objects and advantages will become apparent from the following more complete description and claims.

Broadly, this invention contemplates a non-corrosive soldering flux comprising rosin and 3-bromo-camphor.

In a particularly desirable embodiment, this invention contemplates a non-corrosive soldering flux comprising rosin and 3-bromo-camphor, said 3-bromo-camphor being present from about 0.1% to about 5% by weight based on the rosin.

The non-corrosive rosin flux of the instant invention contains as activator 3-bromo-camphor. In this type of compound the halogen atom, namely bromine, is non-ionically bonded to the ring by replacing hydrogen. This structure is particularly desirable inasmuch as the molecule will not readily break down and hydrolyze to form corrosive halides.

The soldering flux contemplated by the present invention comprises a mixture of the rosin and 3-bromo-camphor. The activator may be incorporated into the rosin by adding a small amount of plasticizer, such as turpentine, to the rosin, heating until the mixture is fluid, adding the activator and stirring until an intimate mixture of these ingredients is obtained. In place of turpentine we may use alcohol, depending whether a solid plastic flux or a liquid flux is desired. The activator employed in the present invention should be present in the amount of from about 0.1 to about 5% by weight of the rosin.

The following example is typical of the preparation of the products contemplated by this invention.

91 grams of pure pale yellow rosin were gently heated with 8 grams of turpentine and stirred until a homogeneous liquid phase was attained. Then, 1 gram of 3-bromo-camphor was added, stirred until dissolved, and allowed to cool. It should be noted that the 3-bromo-camphor was very soluble in this mixture and the mixture was easy to prepare. The product had good flux consistency.

A similar mixture was made with 2 grams of 3-bromo-camphor in place of 1 gram.

Also, a 50% rosin in alcohol solution was prepared using 1% by weight of 3-bromo-camphor to form a liquid flux.

The above samples of fluxes together with pure rosin were then evaluated in the various tests described in Specification QQ-S-571c. Their respective spreading characteristics on 1½″ x 1½″ copper squares, as compared to pure rosin, all showed substantially no spattering, and more than twice the flow area of pure rosin. No corrosion was detected on any of the samples after exposure of the copper squares to 100% humidity at 100° C. for 240 hours. Corrosion on an electrically polarized fine copper wire was negligible.

A solid flux containing 1% 3-bromo-camphor, as prepared above, was evaluated for resistivity in the manner described in Specification QQ-S-571c. Water extracts utilizing deionized water having a resistivity of 1,000,000 ohms-cm. was used. The flux had a resistivity of 340,000 ohm-cm. as compared to the control, less the activator, having a resistivity of 500,000 ohm-cm. The cited Federal Specification requires a resistivity of at least 100,000 ohm-cm. As can readily be seen, the resistivity of the instant invention is well above this minimum requirement which is also widely adhered to by other U.S. Government agencies, such as the Signal Corps, as well as the electronics industry. As a contrast, conventional ionically activated rosin fluxes, when used in small concentrations, will usually have resistivities in the range of from 50,000 to 100,000 ohm-cm. These small concentrations, however, lack sufficient fluxing activity; but where stronger concentrations improve the spreading factor, unsatisfactory resisitivity values result.

The soldering flux of this invention, as exemplified above, combines the desirable characteristics of corrosion resistance, high resistivity, good spread and substantial freedom from noxious and toxic fumes.

While this invention has been described and illustrated by certain specific embodiments, it is not intended to be limited thereto, and other modifications and variations may be employed within the scope of the following claims.

I claim:

1. A non-corrosive solder flux composition, consisting essentially of rosin and 3-bromo-camphor, said 3-bromo-camphor being present from about 0.1% to about 5% by weight based on the rosin.

2. A non-corrosive solder flux composition, consisting essentially of rosin, 3-bromo-camphor and an alcohol, said 3-bromo-camphor being present from about 0.1% to about 5% by weight based on the rosin.

3. A non-corrosive solder flux composition, consisting essentially of rosin, 3-bromo-camphor and turpentine, said 3-bromo-camphor being present from about 0.1% to about 5% by weight based on the rosin.

References Cited in the file of this patent

UNITED STATES PATENTS

| | | |
|---|---|---|
| 949,925 | Brown | Feb. 22, 1910 |
| 1,724,680 | Ripley | Aug. 13, 1929 |
| 2,037,793 | Jacobson | Apr. 21, 1936 |

FOREIGN PATENTS

| | | |
|---|---|---|
| 20,858 | Australia | Dec. 13, 1929 |
| 662,697 | Great Britain | Dec. 12, 1951 |